United States Patent
Zamel et al.

[11] Patent Number: 5,986,805
[45] Date of Patent: Nov. 16, 1999

[54] POLARIZER/MODULATOR ASSEMBLY FOR LASERS

[75] Inventors: James M. Zamel, Hermosa Beach; John A. Szot, Chino; David A. Burchman, Las Flores, all of Calif.

[73] Assignee: TRW Inc., Redondo Beach, Calif.

[21] Appl. No.: 09/022,640

[22] Filed: Feb. 12, 1998

[51] Int. Cl.$^6$ ................................ G02B 5/30; H01S 3/08
[52] U.S. Cl. .................. 359/500; 359/483; 359/501; 359/900; 372/27; 372/34; 372/106
[58] Field of Search ..................... 359/228, 483, 359/484, 485, 487, 500, 614, 896, 501, 900; 372/27, 35, 106, 109, 34; 219/121.6, 121.61; 362/19

[56] References Cited

U.S. PATENT DOCUMENTS

| | | | |
|---|---|---|---|
| 3,635,543 | 1/1972 | Collins | 359/501 |
| 3,655,268 | 4/1972 | Reynolds | 359/487 |
| 4,019,151 | 4/1977 | Brueckner et al. | 359/487 |
| 4,116,542 | 9/1978 | Moncur et al. | 359/896 |
| 4,498,179 | 2/1985 | Wayne et al. | 372/27 |
| 4,664,484 | 5/1987 | Hines | 359/487 |
| 4,689,467 | 8/1987 | Inoue | 219/121.76 |
| 4,818,835 | 4/1989 | Kuwabara et al. | 219/121.6 |
| 5,001,608 | 3/1991 | Kehrli et al. | 362/19 |
| 5,229,569 | 7/1993 | Miyauchi et al. | 219/121.6 |
| 5,260,827 | 11/1993 | Dziekan | 359/501 |
| 5,265,113 | 11/1993 | Halldorsson et al. | 372/36 |
| 5,331,652 | 7/1994 | Rapoport et al. | 372/35 |
| 5,357,539 | 10/1994 | Otani et al. | 372/35 |
| 5,491,580 | 2/1996 | O'Meara | 359/584 |
| 5,555,254 | 9/1996 | Injeyan et al. | 372/33 |
| 5,572,362 | 11/1996 | Shikama et al. | 359/495 |

FOREIGN PATENT DOCUMENTS

| | | | |
|---|---|---|---|
| 1565507 | 5/1969 | France | 359/487 |
| 2208091 | 10/1973 | Germany | 359/487 |
| 2099176 | 12/1982 | United Kingdom | 359/487 |

*Primary Examiner*—Cassandra Spyrou
*Assistant Examiner*—John Juba, Jr.
*Attorney, Agent, or Firm*—Michael S. Yatsko

[57] ABSTRACT

A polarizer/modulator assembly (10) including a polarizing unit (12) and a modulator unit (14) that are selectively and independently positionable within a resonator cavity of a solid state diode slab laser. The polarizing unit (12) includes a pair of polarizing elements (32, 34) positioned in a "V-shaped" configuration so that both elements (32, 34) are positioned at Brewster's angle with respect to the beam path to combine to polarize the light in the same direction. The combination of the polarizing elements (32, 34) eliminates beam deflection when the polarizer unit (12) is inserted into the beam path. The polarizing elements (32, 34) are mounted in a metal housing (30) that captures rejected light from the polarizing elements (32, 34). The housing (30) includes a cooling tube (52) to control temperature of the housing (30) during temperature build-up caused by the rejected light.

23 Claims, 2 Drawing Sheets

POLARIZER/MODULATOR ASSEMBLY FOR LASERS

BACKGROUND OF THE INVENTION

1. Field of the Invention

This invention relates generally to a polarizer/modulator assembly for a laser and, more particularly, to a polarizer/modulator assembly for a solid state diode laser, including an independently removable polarizer unit and modulator unit, where the polarizer unit corrects for beam polarization when the polarizer unit is moved into the beam path and absorbs the light that is reflected from the polarizer and removes the resultant heat.

2. Discussion of the Related Art

High-power, solid state lasers, such as diode pumped slab lasers, that are used for many purposes, such as cutting, drilling and welding of various materials, electronics manufacture, medical treatment, nuclear fusion, laser weapons, etc., are known in the art. A solid state slab laser will include one or more gain modules having a solid state laser gain medium, such as a crystal of neodymium yttrium aluminum garnet (Nd:YAG), Yb:YAG, Ti:Sapphire or neodymium glass (Nd: Glass), and an optical pumping source to produce a population inversion in the gain medium. The gain medium typically has a slab configuration with a rectangular cross-section and optically polished major side and end faces. The optical pumping source generally is an array of diodes positioned adjacent to the side faces of the slab. The laser gain medium absorbs radiation from the diodes to create a population inversion within the medium to produce a laser output. The end faces of the slab are preferably formed at a non-perpendicular angle to the side faces so that light travels longitudinally in a zig-zag pattern through the laser gain medium as it is reflected off of the side faces. The diodes are switched on and off in a controlled manner to generate a square-wave pulsed laser beam emitted from the gain medium. The light output of the diode arrays can be accurately tuned to the absorption line of the active material of the laser gain medium to achieve a high pumping efficiency. A high power solid state slab laser of this type is disclosed in U.S. Pat. No. 5,555,254 issued to Injeyan et al., Sep. 10, 1996 and U.S. patent application Ser. No. 08/683,585, filed Jul. 15, 1996, titled Diode Laser Pumped Solid State Laser Gain Module, and assigned to the assignee of the instant invention.

The laser beam generated by the gain module discussed above typically is elliptically polarized when it is emitted from the gain module because of the configuration of the slab. Because the beam is elliptically polarized, it sometimes needs to be linearly polarized depending on the particular use or application of the beam. For example, if the laser is to be used for a cutting or drilling process, then an elliptically polarized beam is undesirable because the beam will not provide the best available laser/material interaction for these applications. To improve the interaction, the beam is first linearly polarized, and is then optically rotated to provide a circularly polarized beam suitable for these applications. If the laser is being used for a welding process, non-coherent or elliptically polarized light is suitable, and thus the beam is generally not polarized so as to eliminate loss of beam intensity by the polarization process. Different laser designs and different applications have different polarization requirements.

Additionally, it is sometimes desirable to modulate the beam to provide high peak power for cutting and drilling applications. It is necessary that the laser beam be polarized before it is modulated. The modulator modulates the relatively long, square-wave beam pulses to provide short duration beam pulses (such as on the order of 100 nanoseconds) having a relatively high peak power, for example on the order of 500 kilowatts, that provides greater precision and control for certain applications. In one example, the laser beam pulses generated by the high power solid state laser gain module are modulated by an acousto-optical modulator that provides the modulation wave for modulating the beam pulses from the gain module. U.S. patent application Ser. No. 08/593,961, filed Jan. 30, 1996, titled Laser Pulse Profile Control By Modulating Relaxation Oscillations, assigned to the assignee of this application, and herein incorporated by reference, provides a more detailed discussion of a modulator for a diode-pumped solid state diode slab laser.

To provide for selective polarization of the light beam for various applications, the laser must be designed to allow the operator to selectively insert and remove the polarizing unit into and out of the beam path in a convenient manner. When the polarizer is inserted into the beam path to polarize the light, refraction of the light by the polarizing element causes the beam to deflect from the desired beam path. Therefore, the beam has to be returned or realigned to the output coupler, mirrors and other optical components in the laser each time the polarizer is put into or taken out of the beam path so that the beam is appropriately aligned with these optical components. Additionally, the polarizing element causes birefringence of the light beam that disperses or reflects a portion of the laser beam off of the polarizing element and out of the beam path. The dispersed portion of the light beam may impinge critical structural and optical components of the laser causing an undesirable heat build-up in the components. The heat build-up may cause dimensional changes of the components that may in turn produce beam distortion, unwanted beam steering and damage to the components. Further, the polarizer and/or modulator must be compact in design to accommodate the space constraints of the laser resonator cavity and laser packaging.

What is needed is a polarizer/modulator assembly that is compact in design, is readily connected to a solid state laser, provides for beam correction and tuning, and absorbs reflected light from the polarizing element and removes resulting heat. It is therefore an object of the present invention to provide such a polarizer/modulator assembly.

SUMMARY OF THE INVENTION

In accordance with the teachings of the present invention, a polarizer/modulator assembly is disclosed for a laser that fits into a small linear resonator cavity of the laser. The assembly includes a separate polarizing unit and a modulator unit independently mounted to a base plate so the polarizing unit and the modulator unit can be selectively and independently positioned in the beam path within the resonator cavity. The polarizing unit includes a pair of polarizing elements positioned in a "V-shape" configuration so that both elements are at Brewster's angle with respect to the beam path to combine to polarize the light beam in the same direction. The combination of the two polarizing elements eliminates beam deflection when the polarizer unit is inserted into the beam path. The polarizing elements are mounted in a metal housing that captures non-polarized light rejected from the polarizing elements as a result of the birefringence of the elements. The housing includes a cooling system to control the temperature of the housing from temperature build-up caused by the rejected light.

Additional objects, advantages, and features of the present invention will become apparent from the following descrip-

DETAILED DISCUSSION OF THE PREFERRED EMBODIMENTS

The following discussion of the preferred embodiments of the invention directed to a polarizer/modulator assembly for a laser is merely exemplary in nature, and is in no way intended to limit the invention or its applications or uses. The polarizer/modulator assembly of the invention will be described below in connection with a solid state diode slab laser. However, as will be appreciated by those skilled in the art, the polarizer/modulator assembly has application for a wide variety of different types of lasers, as well as other applications.

Figure 1:
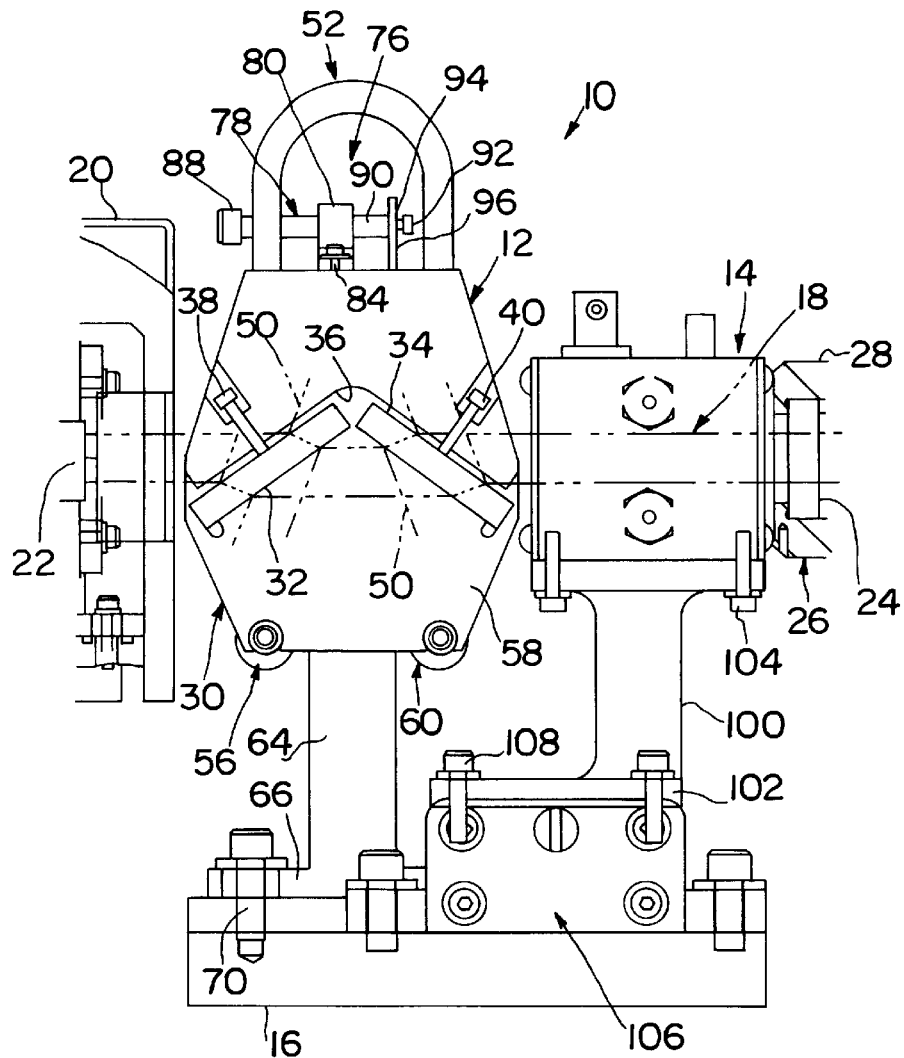
FIG. 1 is a plan view of a polarizer/modulator assembly according to an embodiment of the present invention.
Figure 2:
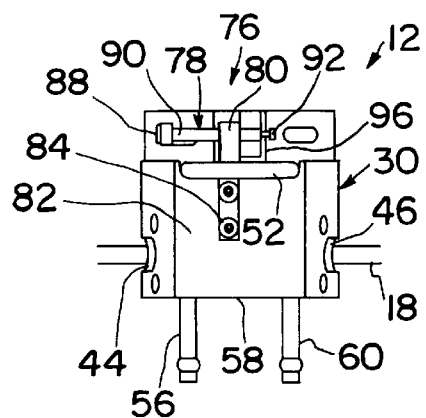
FIG. 2 is a top view of a polarizing unit of the polarizer/modulator assembly shown in FIG. 1.
Figure 3:
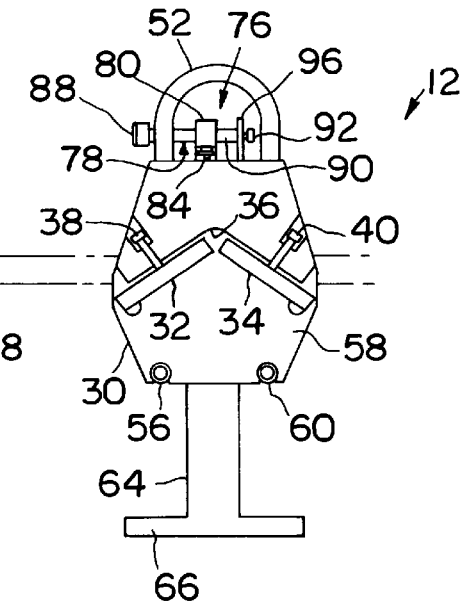
FIG. 3 is a front view of the polarizing unit of the polarizer/modulator assembly shown in FIG. 1.
Figure 4:
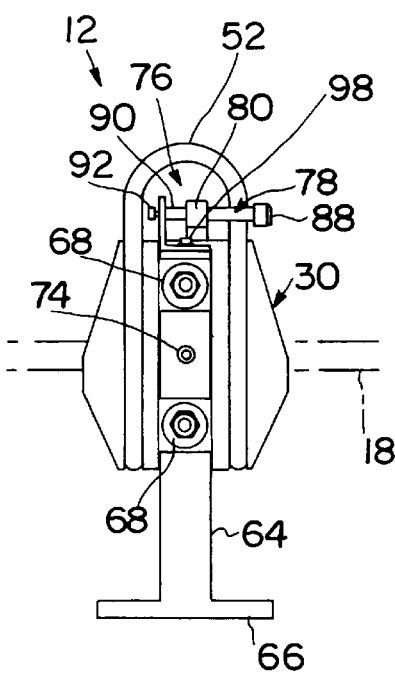
FIG. 4 is a back view of the polarizing unit of the polarizer/modulator assembly shown in FIG. 1.
Figure 5:
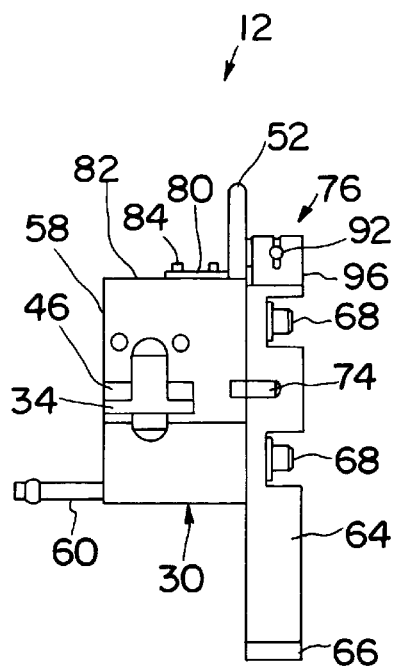
FIG. 5 is a side view of the polarizing unit of the polarizer/modulator assembly shown in FIG. 1.

FIG. 1 shows a plan view of a polarizer/modulator assembly 10, according to one embodiment of the invention, that is incorporated as part of a laser, such as a diode-pumped solid state diode slab laser. The assembly 10 includes a polarizer unit 12 and a modulator unit 14 independently mounted to a base plate 16, as shown. The polarizer unit 12 and the modulator unit 14 selectively polarize and modulate a light beam 18 generated by and emitted from a gain module 20 for various laser applications. These applications include precision laser machining to form or shape a workpiece (not shown). The light beam 18 generated by the gain module 20 is, in one example, a pulsed, square wave laser beam having a predetermined pulse width and pulse rate. The gain module 20 includes a zig-zag slab 22, and can be, for example, the solid state diode laser gain module disclosed in the Ser. No. 08/683,585 application discussed above. However, as will be appreciated by those skilled in the art, the gain module 20 can be any suitable laser gain module known in the art usable in conjunction with the assembly 10 as described herein. Only a portion of the gain module 20 is shown because it forms no part of the present invention, but is shown as an example of the type of laser gain module used in connection with the assembly 10. It is noted that different laser designs may include more than one gain module.

The light beam 18 propagating through the assembly 10 impinges a partially reflective mirror 24 of an optical outcoupler 26. The light beam 18 is reflected off of the mirror 24 and travels back through the assembly 10 into the gain module 20 where it is reflected off of a mirror (not shown) at the opposite end of the slab 22 within the module 20. The mirror (not shown) and the outcoupler mirror 24 define the resonator cavity of the laser. The polarizing unit 12 and the modulator unit 14 are positioned within the resonator cavity between the end face of the slab 22 and the mirror 24 as shown. When the lasing process increases the intensity of the beam 18 in the slab 22 high enough to overcome the reflectiveness of the mirror 24, the beam 18 is emitted from the outcoupler 26. The outcoupler 26 includes an optical cell 28 that cools the light beam 18 before the light beam is emitted from the laser. An optical cell of this type is disclosed in U.S patent application Ser. No. 08/780,246, filed Jan. 8, 1997, titled Face-Cooled High-Power Laser Optic Cell and assigned to the assignee of this application. Only a portion of the outcoupler 26 is shown by way of example, because it also forms no part of the present invention.

FIGS. 2–5 show various views of the polarizer unit 12 separated from the assembly 10. The unit 12 includes a housing 30, made of a heat conductive and easily machinable metal such as copper, that supports and positions a pair of polarizing elements 32 and 34. The polarizing elements 32 and 34 are mounted within a specially configured cavity 36 in the housing 30 in a press fit engagement so that they are positioned in a "V-shape" configuration, as shown. A bolt or pin 38 holds the polarizing element 32 in the proper location within the cavity 36, and a bolt or pin 40 holds the polarizing element 34 in the proper location within the cavity 36. The orientation of the elements 32 and 34 relative to the beam 18 is at Brewster's angle so the beam 18 is linearly polarized (here in the vertical direction) when the beam 18 travels through the elements 32 and 34. Of course, the polarizing elements 32 and 34 can be positioned within the housing 30 at any desirable orientation to provide the type and degree of polarization for a particular application. As is known in the art, Brewster's angle is the angle of incidence of the beam 18 relative to a polarizing element that causes a component of the beam 18 not oriented in the polarization direction to be reflected from the element as a result of the birefringence of the element. As will be appreciated by those skilled in the art, the polarizing elements 32 and 34 can be any suitable polarizing elements such as glass, thin film polarizers, Brewster plates, etc., that polarize laser light. In this example, the polarizing elements 32 and 34 are fused silica plates, having a predetermined thickness, and are positioned substantially at 60_ relative to the propagation direction of the beam 18 to provide the linear polarization. The angle of the polarizing elements 32 and 34 relative to the beam path would depend on the particular material of the elements 32 and 34.

The position of the elements 32 and 34 within the cavity 36, and the location of the pins 38 and 40, is such that the light beam 18 propagates through the housing 30 and the elements 32 and 34. The light beam 18 is emitted into the housing 30 through a suitable opening 44 and contacts the first polarizing element 32. Refraction of the light beam 18 within the element 32 causes the beam 18 to drop from its original beam path entering the housing 30 based on the elements' thickness, here approximately ⅛ of an inch. The refracted light beam 18 continues travelling through the cavity 36 and contacts the second polarizing element 34. The orientation of the element 34 is opposite to the element 32 (in the "V-shape") which causes the light beam 18 to be refracted back to the original beam path. Thus, the light beam 18 is emitted from the housing 30 through an opening 46 along substantially the same beam path as the light beam 18 is introduced into the housing 30 through the opening 44. Because the light beam 18 is maintained on the same beam path whether the polarizing unit 12 is positioned in the resonator cavity or not, the light beam 18 does not need to be realigned when the polarizing unit 12 is moved into and out of the beam path. Additionally, the second polarizing element 34 provides additional polarization of the beam 18 in the same direction as the polarization of the first polarizing element 32 for increased polarization of the beam 18.

When the beam 18 contacts the polarizing elements 32 and 34, the birefringence of the elements 32 and 34 causes the unpolarized portion of the light beam 18 to be reflected from the elements 32 and 34. This loss of light intensity is depicted as dotted lines 50. Reflections are shown at each surface of the polarizing elements 32 and 34 because the light beam 18 reflects back and forth between the reflector 24 and the slab 22 within the resonator cavity during the lasing process. Because the elements 32 and 34 are positioned within the housing 30, the lost light 50 is captured and absorbed by the housing 30, and thus the lost light 50 does not impinge other optical components within the laser that could cause an undesirable heat build-up effecting the operation of the laser.

In order to prevent heat build-up within the housing 30 from the rejected light 50, a stainless steel (or other heat conductive material) cooling tube 52 is secured to a channel formed within a back surface of the housing 30. The cooling tube 52 includes an inlet end connector 56 protruding from a front surface 58 at one side of the housing 30, and an outlet end connector 60 protruding from the front surface 58 at an opposite side of the housing 30, as shown. The tube 52 runs from the inlet connector 56 through a bottom portion of the housing 30, extends up one side of a back surface of the housing 30 through the channel, extends above the housing 30, curves downward through the channel along an opposite side of the back surface of the housing 30, and extends back through the housing 30 to the outlet connector 60, as shown. In operation, a flexible inlet hose (not shown) is connected to the inlet connector 56 and a flexible outlet hose (not shown) is connected to the outlet connector 68. A pump (not shown) and a heat exchanger (not shown) force a cooling fluid, such as water, through the tube 52 to cool the housing 30. Of course, the orientation of the cooling tube 52 in the housing 30 is shown by way of example in that other orientations of the tube 52 can be provided and still provide suitable cooling of the housing 30.

As mentioned above, the polarizing unit 12 is removably connected to the base plate 16. Particularly, a metal bracket 64, including a base mount 66, is connected to the housing 30 by bolts 68, and the base mount 66 is connected to the base plate 16 by bolts 70. Therefore, the unit 12 can be removed from the laser resonator cavity by removing the bolts 70. A pivot rod 74 is rigidly secured to the bracket 64. When the bolts 68 are loose, the housing 30 is pivotally mounted to the pivot rod 74 so that the polarizing elements 32 and 34 can be adjustably positioned at the proper angle relative to the light beam 18 for proper polarization. By rotating the housing 30 on the rod 74, the angle of the polarizing elements 32 and 34 relative to the light beam 18 can be adjusted.

To provide this adjustment, a push-pull screw assembly 76 is provided as part of the unit 12. The screw assembly 76 includes a screw 78 threaded into a bracket 80 that is rigidly secured to a top surface 82 of the housing 30 by bolts 84. The screw 78 includes a head 88, a body 90 and a stop 92. A recessed portion 94 of the body 90 extends through a stop bracket 96 so that the screw 78 can readily rotate within the bracket 96. The stop bracket 96 is rigidly secured to the bracket 64 by bolts 98. By rotating the screw 78 in one direction, the screw 78 is threaded into the bracket 80 towards the bracket 96, so that the body 90 applies pressure against the bracket 96 to rotate the housing 30 in a clockwise direction on the rod 74. By rotating the screw 78 in the opposite direction, the screw 78 is threaded out of the bracket 80 away from the bracket 96, so that the stop 92 applies pressure against the bracket 92 to rotate the housing 30 in the counter-clockwise direction on the rod 74. Thus, the angle of incidence of the beam 18 on the polarizing elements 32 and 34 can be changed by the screw assembly 76. Once the proper orientation of the elements 32 and 34 is provided, the bolts 68 are tightened so that the housing 30 is rigidly secured to the bracket 64 in this position.

The modulator unit 14 also includes a metal bracket 100 and a base mount 102. The bracket 100 is bolted to the unit 14 by bolts 104 and the base mount 102 is bolted to a modulator adjuster 106 by bolts 108. Therefore, the modulator unit 14 can be removed from the resonator cavity by removing the bolts 108 independent of the polarizing unit 12. The modulator adjuster 106 is a conventional five-axis adjustment device, known in the art, that allows the modulator unit 14 to be properly oriented within the resonator cavity to allow the optical component in the unit 14 to be positioned relative to the path of the beam 18. As discussed above and in the Ser. No. 08/593,961 patent application, the modulator unit 14 divides the laser pulses generated by the gain module 20 into short duration pulses having a high peak power. The modulator unit 14 uses an acoustical wave, for example 24 MHz, to impinge the laser pulses from a transverse direction to provide the modulation. A modulator of the type of a modulator unit 14 is a conventional modulator available, for example, from IntraAction of Bellwood, Ill.

The foregoing discussion of the preferred embodiments is merely exemplary in nature. One of ordinary skill in the art would readily recognize from this discussion that various changes, modifications and variations could be made to the invention without departing from the spirit and scope of the invention as defined in the following claims.

What is claimed is:

1. An optical assembly comprising:
   a housing;
   a first polarizing element and a second polarizing element positioned within the housing to receive a light beam along a beam path, said polarizing elements polarizing the light beam in a predetermined direction, said first and second polarizing elements being oriented in the housing at a predetermined angle relative to the beam path so as to polarize the light beam in substantally the same direction, said first and second polarizing elements both refracting the light beam such a manner that the light beam exiting the second polarizing element and the housing travels substantially the same beam path as the light beam entering the first polarizing element and the housing, said housing capturing a portion of the light beam that is reflected from the polarizing element as non-polarized light; and
   a cooling system, said cooling system cooling the housing in response to heat build-up caused by the portion of the light beam captured by the housing.

2. The assembly according to claim 1 wherein the first and second polarizing elements are positioned within the housing in a "V-shaped" configuration so that the first and second polarizing elements are angled relative to the beam path in opposite orientations.

3. The assembly according to claim 1 wherein the first and second polarizing elements are made of fused silica.

4. The assembly according to claim 1 wherein the cooling system includes a cooling tube attached to the housing, said cooling tube providing a path for a cooling fluid.

5. An optical assembly comprising:
   a housing;
   a mounting bracket, said mounting bracket including a pivot rod rigidly secured thereto, said housing being pivotally mounted on the pivot rod and being rotatable thereon;

at least one polarizing element positioned within the housing to receive a light beam along a beam path, said polarizing element polarizing the light beam in a predetermined direction, said housing capturing a portion of the light beam that is reflected from the polarizing element as non-polarized light; and a cooling system, said cooling system cooling the housing in response to heat build-up caused by the portion of the light beam captured by the housing.

6. The assembly according to claim 5 further comprising an adjustment device, said adjustment device being adjustable to rotate the housing on the pivot rod to cause the angle of the at least one polarizing element to change relative to the beam path.

7. The assembly according to claim 6 wherein the adjustment device is a push-pull adjustment screw threadably engaged with a screw bracket secured to the housing, wherein rotation of the screw in one direction pushes the screw against one side of a stop bracket secured to the mounting bracket to rotate the housing on the pivot rod in one direction and rotation of the screw in an opposite direction pushes the screw against an opposite side of the stop bracket to rotate the housing on the pivot rod in an opposite direction.

8. An optical assembly comprising:

a housing;

at least one polarizing element positioned within the housing to receive a light beam along a beam path, said polarizing element polarizing the light beam in a predetermined direction, said housing capturing a portion of the light beam that is reflected from the polarizing element as non-polarized light; and a cooling system, said cooling system cooling the housing in response to heat build-up caused by the portion of the light beam captured by the housing wherein the housing, the at least one polarizing element and the cooling system are combined as a polarizing unit, said polarizing unit being selectively and removably mounted to a base plate to insert and remove the polarizing element into and out of the beam path.

9. The assembly according to claim 8 wherein the polarizing unit is inserted in a resonator cavity of a solid state laser when the polarizing element is in the beam path.

10. An optical assembly comprising:

a housing;

a modulator unit;

at least one polarizing element positioned within the housing to receive a light beam along a beam path, said polarizing element polarizing the light beam in a predetermined direction, said housing capturing a portion of the light beam that is reflected from the polarizing element as non-polarized light, said modulator unit being positioned in the beam path and modulating the polarized light beam from the polarizing element; and a cooling system, said cooling system cooling the housing in response to heat build-up caused by the portion of the light beam captured by the housing.

11. A polarizing assembly for polarizing a beam of light, said assembly comprising:

a housing;

a mounting bracket, said mounting bracket including a pivot rod rigidly secured thereto, said housing being pivotally mounted on the pivot rod and being rotatable thereon; and a first polarizing element and a second polarizing element positioned within the housing to receive the light beam along a beam path, said first and second polarizing elements being oriented in the housing at a predetermined angle relative to the beam path so as to polarize the light beam in substantially the same direction, said first and second polarizing elements both refracting the light beam in such a manner that the light beam exiting the second polarizing element and the housing travels along substantially the same beam path as the light beam entering the first polarizing element and the housing.

12. The assembly according to claim 11 wherein the first and second polarizing elements are positioned within the housing in a "V-shaped" configuration so that the first and second polarizing elements are angled relative to the beam path in opposite orientations.

13. The assembly according to claim 11 further comprising an adjustment device, said adjustment device being adjustable so as to rotate the housing on the pivot rod to cause the angle of the first and second polarizing elements to change relative to the beam path.

14. The assembly according to claim 13 wherein the adjustment device is a push-pull adjustment screw threadably engaged with a screw bracket secured to the housing, wherein rotation of the screw in one direction pushes the screw against one side of a stop bracket secured to the mounting bracket to rotate the housing on the pivot rod in one direction and rotation of the screw in an opposite direction pushes the screw against an opposite side of the stop bracket to rotate the housing on the pivot rod in an opposite direction.

15. A polarizer/modulator assembly for a laser comprising:

a base plate;

a polarizing unit removably connected to the base plate, said polarizing unit including at least one polarizing element positioned to receive a light beam along a beam path, said polarizing element acting to polarize the light beam in a predetermined direction; and a modulator unit removably connected to the base plate, said modulator unit including modulating optics for modulating the light beam, wherein the polarizing unit and the modulator unit are independently removable from the base plate;

said laser including at least one solid state diode slab gain medium and the polarizing unit and the modulator unit are selectively and independently removable from a resonator cavity of the laser.

16. The assembly according to claim 15 wherein the at least one polarizing element is a first polarizing element and a second polarizing element, said first and second polarizing elements being oriented at a predetermined angle relative to the beam path so as to polarize the light beam in the same direction, said first and second polarizing elements both refracting the light beam in such a manner that the light beam exiting the second polarizing element travels along substantially the same beam path as the light beam entering the first polarizing element.

17. The assembly according to claim 16 wherein the first and second polarizing elements are positioned within the housing in a "V-shaped" configuration so that the first and second polarizing elements are angled relative to the beam path in opposite orientations.

18. A polarizer/modulator assembly for a laser comprising:

a base plate;

a housing;

a polarizing unit removably connected to the base plate, said polarizing unit including at least one polarizing element positioned within said housing to receive a light beam along a beam path, said polarizing element acting to polarize the light beam in a predetermined direction, said housing capturing a portion of the light beam that is reflected from the polarizing element as non-polarized light; and a modulator unit removably connected to the base plate, said modulator unit including modulating optics for modulating the light beam, wherein the polarizing unit and the modulator unit are independently removable from the base plate.

19. The assembly according to claim 18 wherein the housing includes a cooling system, said cooling system cooling the housing in response to heat build-up caused by the portion of the light being reflected from the polarizing element.

20. The assembly according to claim 18 wherein the polarizing unit includes a mounting bracket, said mounting bracket being connected to the base plate, said mounting bracket including a pivot rod rigidly secured thereto, said housing being pivotally mounted on the pivot rod and being rotatable thereon.

21. The assembly according to claim 20 wherein the polarizing unit further includes an adjustment device, said adjustment device being adjustable to rotate the housing on the pivot rod to cause the angle of the at least one polarizing element to change relative to the beam path.

22. A method of polarizing a light beam, said method comprising the steps of:

generating the light beam;

providing a housing;

providing at least one polarizing element positioned within the housing;

directing the light beam into the housing along a beam path to impinge the at least one polarizing element, said polarizing element polarizing the light beam in a predetermined direction;

rotating the housing to adjust the angle of the at least one polarizing element relative to the beam path;

capturing a portion of the light beam reflected from the polarizing element in the housing as non-polarized light; and cooling the housing in response to the heat build-up caused by the portion of the light beam reflected from the at least one polarizing element and captured by the housing.

23. The method according to claim 22 wherein the step of providing at least one polarizing element includes providing a first polarizing element and a second polarizing element positioned within the housing at a predetermined angle relative to the beam path so as to polarize the light beam in substantially the same direction, said first and second polarizing elements refracting the light beam in such a manner that the light beam exiting the second polarizing element and the housing travels along substantially the same beam path as the light beam entering the first polarizing element and the housing.

* * * * *